W. McCONWAY.
CAR WHEEL.
APPLICATION FILED SEPT. 19, 1908.
929,320.
Patented July 27, 1909.
2 SHEETS—SHEET 1.
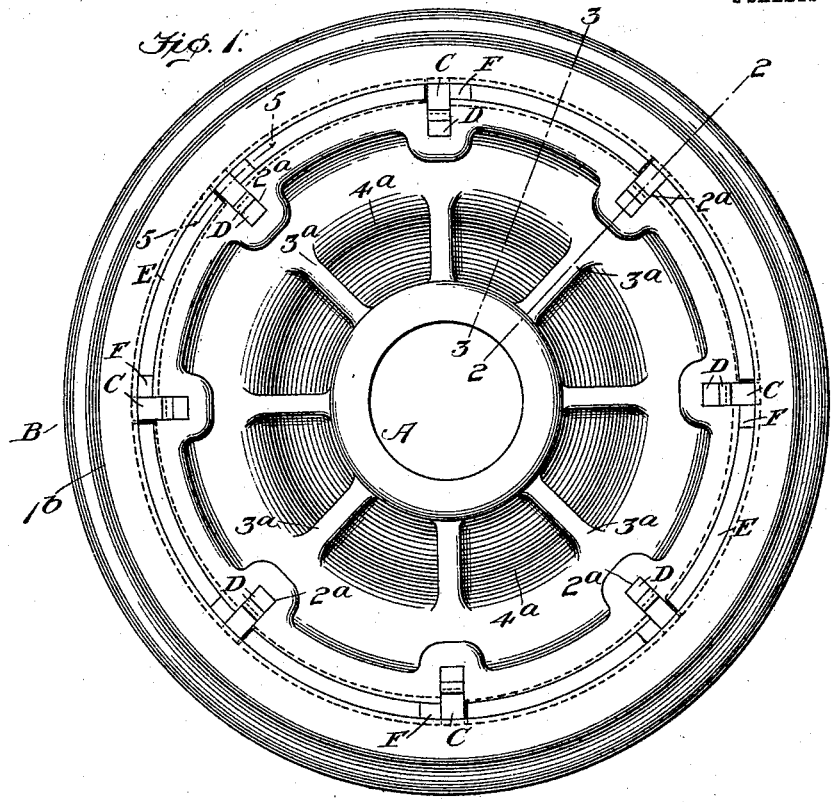
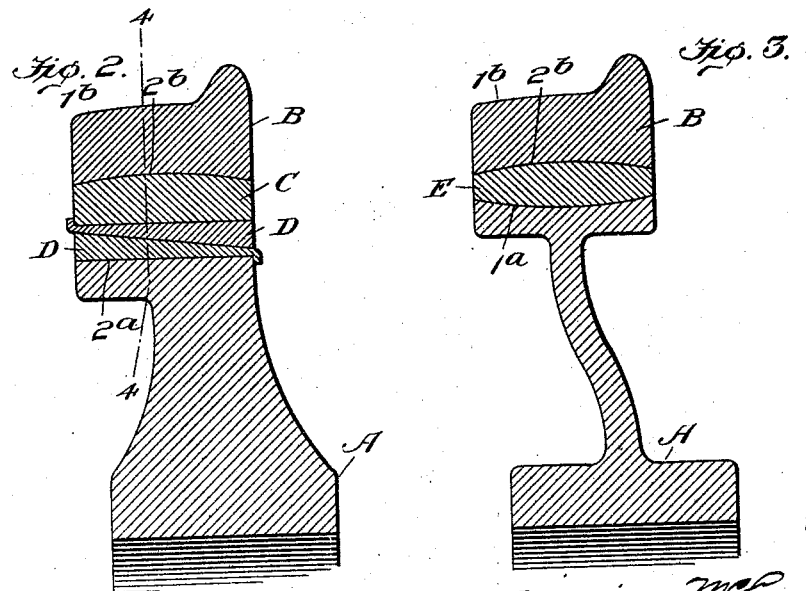
Witnesses
Edwin L. Bradford
G. R. Ritter
Inventor
William McConway
By F. W. Ritter Jr.
Attorney W. McCONWAY.
CAR WHEEL.
APPLICATION FILED SEPT. 19, 1908.
929,320.
Patented July 27, 1909.
2 SHEETS—SHEET 2.
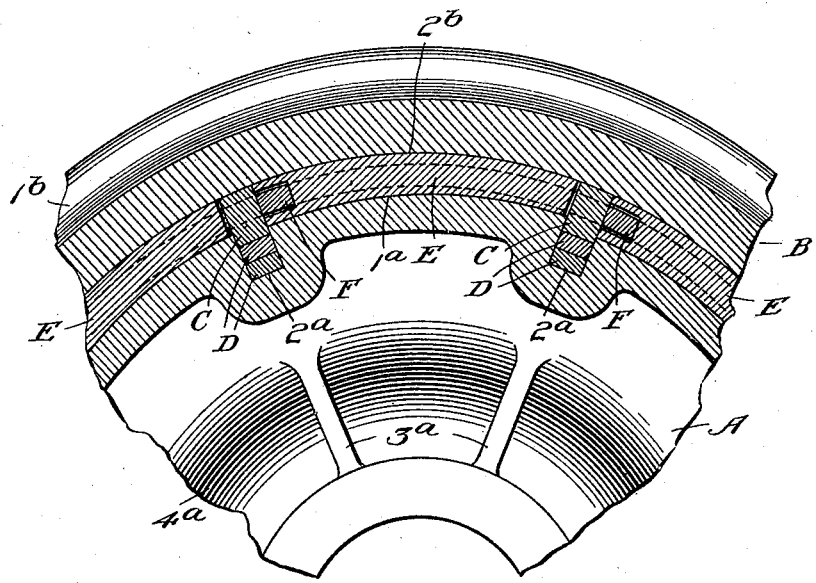
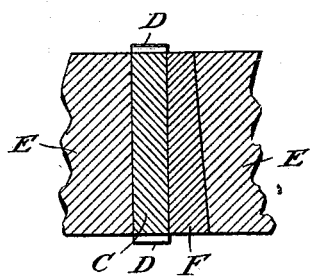 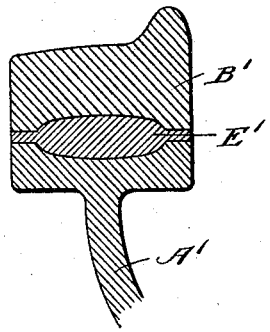 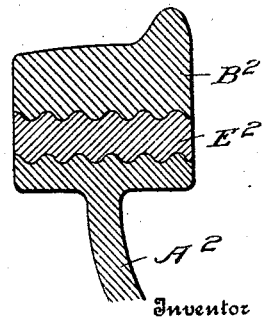
Witnesses
Edwin L. Bradford
Inventor
William McConway
By F. W. Ritter, Jr.
Attorney

UNITED STATES PATENT OFFICE.

WILLIAM McCONWAY, OF PITTSBURG, PENNSYLVANIA.

CAR-WHEEL.

No. 929,320.   Specification of Letters Patent.   Patented July 27, 1909.

Application filed September 19, 1908. Serial No. 453,761.

*To all whom it may concern:*

Be it known that I, WILLIAM McCONWAY, a citizen of the United States, residing at Pittsburg, in the county of Allegheny and State of Pennsylvania, have invented certain new and useful Improvements in Car-Wheels; and I do hereby declare the following to be a full, clear, and exact description of the invention, such as will enable others skilled in the art to which it appertains to make and use the same.

My invention relates to the manufacture of railway car wheels, comprehending not only the structure of the wheel itself, but also the general method employed in producing the completed article.

The purpose of this invention is to provide a wheel that is especially suitable for heavy cars of large capacity, utilizing therefor a material of greater strength than cast iron, which has heretofore been most commonly employed.

In practicing my invention I form a cast steel center or hub section and a somewhat larger rolled steel tire, and place these two parts in such relation to each other that the periphery of the tire is concentric with the center of the hub, a space being thereby left between the inner peripheral face of the tire and the outer periphery of the wheel center. The tire and the center section of the wheel are then permanently secured in their proper relative positions by suitable means which extend across the space lying between the two said members, after which the remaining space between the parts is filled with molten material.

In the drawings chosen for the purpose of illustrating my invention, the scope whereof is pointed out in the claims, Figure 1 is a side view of a car wheel constructed in accordance with my invention; Fig. 2 is a transverse section thereof, taken in the plane of the line 2—2, Fig. 1; Fig. 3 is also a transverse section thereof taken in the plane of the line 3—3, Fig. 1; Fig. 4 is a detail sectional view taken in the plane of the line 4—4, Fig. 2; Fig. 5 is a detail sectional view taken on the line 5—5, Fig. 1; and Figs. 6 and 7 are views corresponding to Fig. 3, but illustrating modifications in the principal elements of the wheel.

Like symbols refer to like parts wherever they occur.

I will now proceed to describe my invention more fully, so that others skilled in the art to which it appertains may practice the same.

In the principal figures of the drawings, A is the central or hub section of the wheel which preferably is formed of cast steel or other material stronger than cast iron. The channeled or otherwise suitably formed periphery $1^a$ of the wheel center A is preferably divided into a series of segmental sections by radial recesses $2^a$ which extend through the member A from face to face. As shown in the drawings, in Figs. 1 and 4, the segmental sections of the periphery $1^a$ of the wheel center may be given a slight eccentricity with respect to each other, so that the locking members E, which are cast in the space between the wheel center A and tire B, are slightly wedge-shaped. When the locking members E have cooled, wedges F inserted between the splines or keys C and the larger end of each of the said members E may be used to force the latter members into intimate contact with the wheel center A and tire B, thus compensating for any shrinkage which may occur in the locking members E during cooling. When a construction such as this is employed, the eccentricity of the segmental peripheral sections should be adjusted to the shrinkage of the material composing the members E, so that the smaller ends of the latter will not come in contact with the adjacent keys C, toward which they are driven, before intimate contact is secured between the sides of the members E and the corresponding faces of the tire and wheel center. The recesses $2^a$ may be conveniently located at the end of ribs or spokes $3^a$ which are cast upon the face of the web $4^a$ of the wheel center.

Surrounding the hub section A, and concentrically arranged with relation thereto, is a rolled steel tire B the inner diameter of which is somewhat larger than the external diameter of the center member A. The tread $1^b$ of the tire is of the usual or any desired form, but the inner circumferential face thereof is preferably channeled, as indicated at $2^b$. The special concave form of the channels $1^a$ and $2^b$ shown in Figs. 1 to 4 of the drawings leaves an annular space between the tire B and hub section A which is substantially lenticular in cross section.

For the purpose of securing the tire B to the wheel center A independently of the molten material which is poured and allowed to solidify in the space between said members, and for the further purpose of dividing said space into separate segments for the reception of such molten material, splines or keys C having faces corresponding to the special form of the tire channel $2^b$ are inserted in the radial recesses $2^a$ of the hub section A and are forced outwardly into firm engagement with the tire B by means of wedges D, D which are inserted in the recesses $2^a$ behind the splines. The splines or keys C and wedges D, D are preferably drop forgings. When the tire section B has been secured in proper position on the center section A by means of the splines C and wedges D, the several parts may be secured in place either by welding, riveting, or other suitable means, as, for example, by lengthening the wedges D and bending the thin ends thereof as shown particularly in Fig. 2; but preferably by welding the ends of the corresponding splines and wedges to each other and to the tire and wheel center, the oxy-acet or electric welding processes being suitable for this purpose. The segmental spaces between adjacent sets of splines and wedges are then filled with molten material, preferably highly graphitic iron the shrinkage of which is very slight. The locking members E formed by the metal when cool engage the channels $1^a$ and $2^b$ in the wheel center and tire, respectively, and effectively support the parts and lock them together. When the molten material has cooled, any slight shrinkage impairing the intimate contact between the several members may be compensated for by calking. In order that absolute contact may be insured between the parts, pressure may also be applied in a radially outward direction to the circumferential flanges of the cast steel member A.

When the segmental sections of the periphery $1^a$ of the wheel center are made eccentric with respect to each other, as before described, metal wedges F are placed against the sides of the splines or keys C before the members E are cast, the arrangement being such that there is a wedge F at the larger end of each of the spaces formed between the wheel center A, tire B, and adjacent sets of splines C and wedges D. By driving the wedges F inwardly after the locking members E have cooled, the latter are forced into intimate contact with the tire and wheel center, as previously explained, and a part or all of any looseness due to shrinkage may be taken up in this manner, as well as by calking or pressure.

In Fig. 6 of the drawings, I have shown a modified form of locking member E' which is cast between its wheel center A' and tire B'; and in Fig. 7 I have shown another modified form of locking member $E^2$ and its appropriate wheel center $A^2$ and tire $B^2$.

Except for the illustrated differences in cross-sectional form, the locking members, wheel centers and tires shown in these modifications are similar to the construction heretofore described.

By my invention a practically integral car wheel may be produced, comprehending the desirable elements of the rolled steel tire, the strong wheel center, and economy of manufacture and maintenance.

Having thus described my invention, what I claim and desire to secure by Letters Patent is:

1. A car wheel comprising a wheel center, a tire, and locking members interposed between the periphery of the wheel center and the inner circumference of the tire and cast between said wheel center and tire in segments, said locking members, wheel center and tire being provided with interfitting faces, and the inner circumferential face of said tire and the periphery of said wheel center being eccentric to each other.

2. A car wheel comprising a wheel center, a tire, means for securing the tire to the wheel center at a plurality of points, and locking members of cast metal cast in the spaces between the said securing means and the tire and wheel center.

3. A car wheel comprising a wheel center having a peripheral channel that is divided into segmental sections by key receiving recesses, a tire having a channel on its inner face, keys in said recesses for securing said tire to said wheel center, and locking members which are separated by said keys and which are interposed between said tire and wheel center.

4. A car wheel comprising a wheel center having spokes and key receiving recesses adjacent to the ends of said spokes, a tire of uniform cross section arranged in spaced relation to said wheel center, said tire having its inner circumferential face channeled, and keys in said recesses for securing said tire to said wheel center.

5. A car wheel comprising a wheel center having a peripheral channel that is divided into segmental sections by key receiving recesses, a tire having a channel on its inner face, keys and wedges arranged in said recesses for securing said tire to said wheel center, said keys having convex faces corresponding to the form of the tire channel, and locking members of cast metal cast in the spaces between said tire and wheel center and separated by said keys.

6. A car wheel comprising a wheel center, the peripheral face of which is divided into segmental sections by key receiving recesses, said segmental faces being eccentric with respect to each other, a tire in spaced relation to said wheel center, keys in said recesses for securing said tire to said wheel center, locking members which are interposed between said tire and said wheel center, and wedges for forcing said locking members into intimate contact with said tire and wheel center.

7. A car wheel comprising a wheel center, a tire, the inner circumferential face of said tire and the periphery of said wheel center being eccentric to each other, and locking members interposed between the periphery of the wheel center and the inner circumference of the tire, said locking members being of non-rectangular cross-section radially of the wheel and being cast between said wheel center and tire in segments.

8. The method of manufacturing car wheels, which consists in placing a metal wheel center within a metal tire and in spaced relation thereto, securing said tire to said wheel center at a plurality of points, and pouring molten metal into the spaces between the tire and wheel center.

9. A wheel center for car wheels, said center having segmental peripheral faces that are non-rectilinear in cross-section and are eccentric with respect to each other.

10. A car wheel comprising a wheel center having key receiving recesses on the periphery thereof, said recesses being arranged in spaced relation, a tire having a uniform cross section, and keys abutting at each side against the wheel center for securing said tire to said wheel center.

11. A car wheel comprising a wheel center, a tire, and wedges for securing said tire to said wheel center, said wedges having socketed engagement with said tire and wheel center.

12. A car wheel comprising a wheel center, a tire, said center and tire being formed to provide circumferentially tapering recesses between them, and wedges fitting in the said circumferential recesses, said wedges being cast in said recesses.

13. A car wheel comprising a wheel center, a tire, and wedges for securing said tire to said wheel center, said wedges being cast between said tire and wheel center.

In testimony whereof I affix my signature, in presence of two subscribing witnesses.

WILLIAM McCONWAY.

Witnesses:
J. W. HARTLEY,
F. D. ECKER.